United States Patent [19]

Araujo et al.

[11] Patent Number: 5,668,067
[45] Date of Patent: Sep. 16, 1997

[54] HIGH PURITY FUSED SILICA HAVING HIGH RESISTANCE TO OPTICAL DAMAGE

[75] Inventors: Roger J. Araujo, Horseheads; Nicholas F. Borrelli, Elmira; Christine L. Hoaglin, Campbell; Charlene Smith, Corning, all of N.Y.

[73] Assignee: Corning Incorporated, Corning, N.Y.

[21] Appl. No.: 697,094

[22] Filed: Aug. 19, 1996

Related U.S. Application Data

[62] Division of Ser. No. 422,104, Apr. 14, 1995, Pat. No. 5,616,159.

[51] Int. Cl.[6] .................................................... C03C 3/06
[52] U.S. Cl. ........................... 501/54; 65/17.4; 65/17.5; 65/17.6; 501/900; 501/905
[58] Field of Search ........................... 501/54, 900, 905; 65/17.4, 17.5, 17.6

[56] References Cited

U.S. PATENT DOCUMENTS

| | | | |
|---|---|---|---|
| 5,326,729 | 7/1994 | Yaba et al. | 501/54 |
| 5,410,428 | 4/1995 | Yamagata et al. | 359/350 |

FOREIGN PATENT DOCUMENTS 0636586  2/1995  European Pat. Off. .

Primary Examiner—Donald E. Czaja
Assistant Examiner—Sean Vincent
Attorney, Agent, or Firm—Angela N. Nwaneri

[57] ABSTRACT

The invention relates to the production of high purity fused silica glass which is highly resistant to optical damage by ultraviolet radiation in the laser wavelength of about 300 nm or shorter. In particular, this invention relates to a fused silica optical member or blank which exhibits substantially no optical damage up to $10^7$ pulses (350 mJ/cm$^2$) at the KrF laser wavelength region of about 248 nm, and at the ArF laser wavelength region of about 193 nm.

3 Claims, 4 Drawing Sheets

HIGH PURITY FUSED SILICA HAVING HIGH RESISTANCE TO OPTICAL DAMAGE

This is a divisional of application Ser. No. 08/422,104, filed Apr. 14, 1995 now U.S. Pat. No. 5,616,159.

BACKGROUND OF THE INVENTION

This invention relates to an essentially hydroxyl-free fused silica glass which is resistant to laser damage and a method of making such glass using molecular hydrogen. Specifically, the invention relates to the use of molecular hydrogen to prevent the 190–300 nm optical absorption of fused silica associated with prolonged exposure to radiation within that wavelength.

Although the exact origin, nature and mechanism of formation of the centers that give rise to absorptions in fused silica are not completely understood, these defects can be identified and tracked by optical absorption and/or electron spin resonance techniques. Two categories of defects can be described: the E' center, centered at about 210 nm and an oxygen related defect, having an absorption at about 260 nm with a corresponding fluorescence at 650 nm.

The E' defect structure consists of a paramagnetic electron trapped in a dangling silicon orbital projecting into interstitial space. As the E' center has an unpaired electron it is detectable by electron spin resonance spectroscopy. The induced E' center has a 5.8 eV (210 nm) absorption band and a 2.7 eV (458 nm) fluorescence band. The absorption at 210 nm is particularly deleterious in ArF (193 nm) laser applications as it tails into the irradiating wavelength region of the laser. For applications such as lenses for 193 nm microlithography it is important to minimize or eliminate any optical absorption in this region of the UV spectrum.

The second observed absorption at 260 nm is a consequence of irradiating silica that contains dissolved molecular oxygen. It has been found that the more oxidizing the flame used to make the glasses the more 260 nm absorption is produced with laser irradiation. Along with the 260 nm absorption is formed 1.9 eV (650 nm) red fluorescence. The 260 absorption is undesirable for KrF (248 nm) laser applications as it is very close to the lasing wavelength; its minimization or elimination is important for the successful use of silica in KrF applications.

One model for the formation of the 260 absorption involves the reaction of dissolved molecular oxygen with fight to give oxygen atoms. The reactive oxygen atoms further react with molecular oxygen to give ozone (260 nm absorption). The ozone has a radiative transition with a red (650 nm) emission. Alternatively, it should be noted that molecular oxygen has also been theorized to react photolytically with silica. Regardless of the mechanism of formation, it is important to note that the 260 nm absorption is related to the molecular oxygen content of the glass.

In the past, many methods have been suggested for improving the optical damage resistance of fused silica glass. It has been generally known that high purity fused silica prepared by such methods as CVD- soot remelting process, plasma CVD process, electrical fusing of quartz crystal powder, and other similar methods, are susceptible to laser damage to various degrees. This variable propensity to laser damage has been attributed to low OH content, sometimes measuring as low as 10 ppm or less as measured from the value of the beta-OH. Therefore, most commonly, it has been suggested to increase the OH content of such glass to a high level. For example, Escher, G. C., KrF Laser Induced Color Centers In Commercial Fused Silicas, SPIE Vol. 998, Excimer Beam Applications, pp. 30–37 (1988), confirms that defect generation rate is dependent upon the fused silica OH content, and that "wet" silicas are the material of choice for KrF applications. Specifically, they note that high OH content silicas are more damage resistant than low OH silicas, due to their room temperature hydrogen annealing properties.

U.S. Pat. No. 5,086,352 and its related U.S. Pat. No. 5,325,230 also claim that the ability to resist optical deterioration from exposure to a short wavelength ultraviolet laser beam depends on the OH group content in the presence of hydrogen gas. Specifically, these references show that for high purity silica glass having low OH content, KrF excimer laser durability is poor. Thus, they suggest to have an OH content of at least 50 ppm.

Similarly, Yamagata, S., Improvement of Excimer Laser Durability of Silica Glass, Transactions of the Materials Research Society of Japan, Vol. 8, pp. 82–96, 1992, discloses the effect of dissolved hydrogen on fluorescence emission behavior and the degradation of transmission under irradiation of KrF excimer laser ray for high purity silica glass containing OH groups to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., Mechanism of Color Center Destruction in Hydrogen Impregnated Radiation Resistant Glasses, Materials Research Bull., Vol. 5, pp. 385–390, 1970, have disclosed that hydrogen-impregnated glasses tend to resist gamma ray-induced radiation.

Japanese Patent Abstract 40-10228 discloses a process by which quartz glass article made by melting is heated at about 400° to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950° to 1400° C. followed by heat treatment in an oxygen atmosphere at the same temperature range.

Shelby, J. E., Radiation Effects in Hydrogen-impregnated Vitreous Silica, J. Applied Physics, Vol. 50, No. 5, pp. 3702–06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass.

There has been no suggestion in the past for a practical method of increasing the optical damage resistance of fused silica glass having low to no OH content, in particular, resistance to optical damage associated with prolonged exposure to UV radiation e.g., 193 or 248 nm excimer laser. Accordingly, it is the object of the present invention to disclose a method of increasing the resistance of high purity fused silica glass to optical damage.

SUMMARY OF THE INVENTION

Briefly, the invention relates to an optical member and method of forming an optical member or blank for use with light having a wavelength range shorter than about 360 nm. The method includes the steps of forming a member or blank from high-purity synthetic silica glass containing OH groups in the amount no greater than 10 wt. ppm, and doping the formed optical member or blank with molecular hydrogen to increase the resistance of the optical member or blank to laser damage. In particular, the hydrogen doped optical member or blank formed by the method of the invention is highly resistant to optical damage up to $10^7$ pulses (350 mJ/cm$^2$) at the KrF laser wavelength of 248 nm.

In one particularly useful aspect of the invention, an optical member or blank is formed from high purity fused silica glass having high resistance to laser damage by a) producing a gas stream containing a silicon-containing compound in vapor form capable of being converted through thermal decomposition with oxidation or flame hydrolysis to SiO$_2$; b) passing the gas stream into the flame of a combustion burner to form amorphous particles of fused SiO$_2$; c) depositing the amorphous particles onto a support; d) consolidating the deposit of amorphous particles into a transparent glass body having OH content no greater than 10 ppm; and e) doping the transparent glass body with molecular hydrogen at high pressure and low temperature to form a glass member having high resistance to optical damage.

As used in the present specification:

"optical damage" or "degradation in optical property" we mean (1) increase in birefringence, (2) increase in refractive index, (3) decrease in homogeneity, (4) decrease in transmission, and (5) increase in fluorescence;

as related to the high purity fused silica of the invention, the terms "low hydroxyl group content" or "dry" mean that the OH group content is less than 50 ppm;

BRIEF DESCRIPTION OF THE DRAWING

In the accompanying drawings.

DETAILED DESCRIPTION OF THE INVENTION

Figure 1:
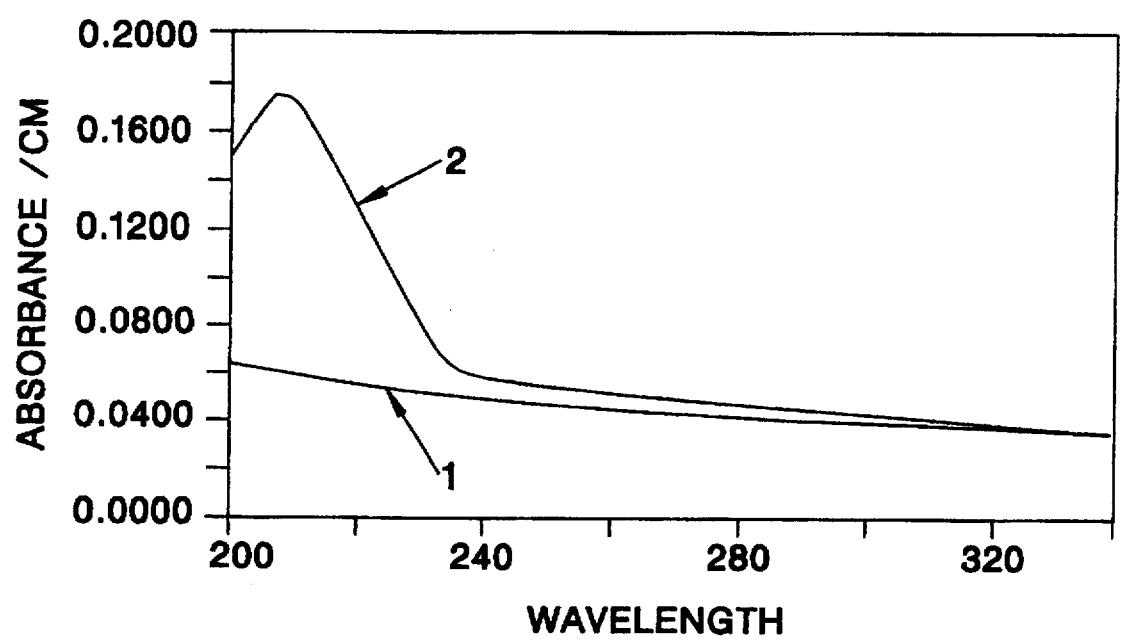
FIGS. 1, 2, 3 and 4 are graphical representations comparing the optical absorption spectra of fused silica glass articles treated in accordance with the present invention with spectra of untreated articles after both are exposed to laser radiation.

The invention will be described below with reference to the drawings. Typical optical absorption spectra of Glass Code 7940, a high purity fused silica glass available from Corning Incorporated, both before and after exposure to about 10$^6$ KrF excimer pulses (248 nm, 250 mJ/cm$^2$) are shown in FIG. 1 by lines 1 and 2 respectively. As shown, there is an additional absorption at about 210 nm caused by the laser exposure. As stated earlier, this absorption band is due to the occurrence or formation of E' centers.

Figure 2:
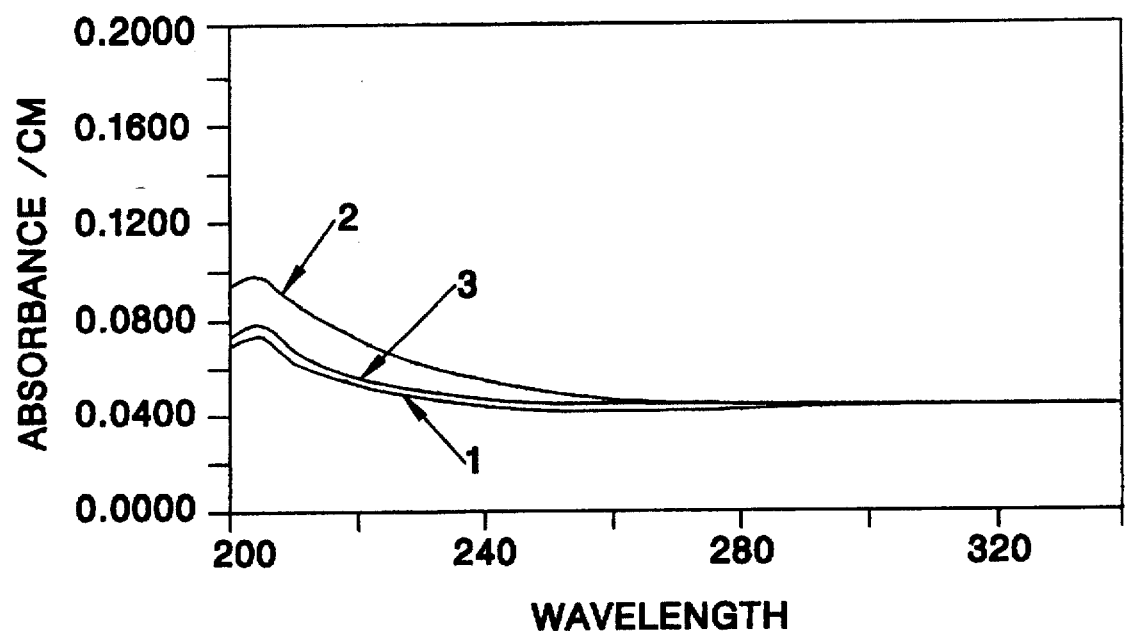

To show that the E' center reacts with hydrogen, a 0.5 mm thick sample of previously damaged fused silica such as shown in FIG. 1, was placed in 12 atm of H$_2$ for 43 days at 85° C. This schedule was determined to be sufficient to fully infiltrate the sample with H$_2$. After removal from the H$_2$, the absorption spectrum was remeasured. The absorption spectrum of the hydrogen-treated sample is shown in FIG. 2 by line 3. As shown, the absorption spectrum previously attributed to the E' center in the untreated sample was eliminated by the hydrogen treatment. Optical damage due to the E' center is clearly evident in the spectrum of the untreated fused silica sample after laser exposure (line 2). As shown, the spectrum of the hydrogen-treated sample, after exposure to laser radiation (line 3) is essentially identical to that of the unexposed sample (line 1). ESR measurements confirmed the absence of the E' center in the treated sample. While not intending to be bound by theory, it is believed that the E' center may have reacted with the H$_2$ to form a SiH bond.

Accordingly, the object of the present invention, that is, to make high purity glass resistant to optical damage caused by exposure to laser radiation, is achieved by forming high purity fused silica glass and subsequently subjecting the formed glass to a post-treatmem involving exposure to high pressure hydrogen. Preferably, the glass is impregnated with a sufficient amount of hydrogen to provide resistance to optical damage at the KrF laser wavelength region of 248 nm as well as the ArF laser wavelength region of 193 nm.

As stated earlier, it has been generally taught that high OH silicas are more resistant to optical damage than low OH silicas. As a result, it has been broadly suggested that in order to produce fused silica glass members having acceptable optical damage resistance, high OH content silicas are the material of choice. This approach of using only high OH silicas however, ignores a large group of fused silica glass which are inherently low in OH content. For example, high purity fused silica made by such known methods as CVD-soot reinciting or soot deposition process, plasma CVD process, electrical fusing of quartz crystal powder, and flame hydrolysis process, are generally characterized by low to substantially no OH content. Until now, there have been little or no practical methods for increasing the optical damage resistance of this group of glass. We have found that by using the method of the present invention, the optical damage resistance of high purity fused silica glass in general, regardless of OH content, can be significantly increased. In particular, we have found that by using the method of the invention, even low OH fused silica glass, which have hitherto been considered impractical for many laser applications, can be made useful for such applications. Using this method, such glass can be made to become as resistant to optical damage as fused silica glass having high OH content.

We have found that by using the method of the invention, high purity fused silica can be made resistant to optical damage in ultraviolet radiation in the wavelength range of 250 nm or less. The method includes (1) forming a blank from high purity synthetic silica glass, and (2) doping the blank with molecular hydrogen at a pressure and temperature sufficient to impregnate the blank with an amount of hydrogen necessary to increase the resistance of the resulting glass member to laser damage.

The blank can be made from any known method capable of producing high purity fused silica glass. Examples of such known methods include the CVD-soot remelting or soot deposition process, plasma CVD process, fused silica boule process, electrical fusing of quartz crystal powder, and flame hydrolysis process. The actual method selected will depend on such considerations as the desired OH content and other considerations. For example, where it is desirable to use low OH fused silica glass, such glass may be prepared as disclosed in commonly assigned U.S. Pat. Nos. 5,043,002, and 3,933,454, both herein incorporated by reference.

One method of making low OH fused silica is by the flame hydrolysis process. In a conventional flame hydrolysis method, a coating of flame hydrolysis-produced glass soot is deposited on a starting member to form a soot preform. The preform is consolidated to form a dense glass layer which can then be formed into a desired shape. In the consolidation step, the soot preform is subjected to a temperature in the consolidation temperature range for a time sufficient to permit the soot particles to fuse and consolidate, thereby forming a dense glass layer which is free from particle boundaries. Preferably, the fused silica glass used to form the optical member of the invention is made from the improved flame hydrolysis process as described in U.S. Pat. No. 3,933,454. In the consolidation step of the latter process, the soot preform is heated to a temperature within the consolidation temperature range for a time sufficient to cause the soot particles to fuse and form a dense glass layer, and simultaneously subjected to a stream of a substantially dry chlorine containing atmosphere.

High OH fused silica useful in the invention can be made by any known method such as the fused silica boule process. In a typical fused silica boule process, an inert gas, nitrogen, is used as a carder gas and a bypass stream of the nitrogen is introduced to prevent saturation of the vaporous stream. The vaporous reactant is passed through a distribution mechanism to the reaction site where a number of burners are present in close proximity to a furnace crown. The reactant is combined with a fuel/oxygen mixture at the burners and combusted and oxidized at a temperature greater than 1700° C. The high purity metal oxide soot and resulting heat is directed downward through the refractory furnace crown where it is immediately deposited and consolidated to a mass of glass on a hot bait.

In one particularly useful embodiment of the invention, an optical member having high resistance to laser damage is formed by doping high purity fused silica glass with molecular hydrogen at a pressure and temperature, and for a time sufficient to impregnate the glass with a sufficient amount of hydrogen to make the glass resistant to laser damage. In this embodiment, the fused silica blank is formed by:

a) producing a gas stream containing a silicon-containing compound in vapor form capable of being converted through thermal decomposition with oxidation or flame hydrolysis to $SiO_2$;

b) passing the gas stream into the flame of a combustion burner to form amorphous particles of fused $SiO_2$;

c) depositing the amorphous particles onto a support; and d) consolidating the deposit of amorphous particles into a transparent glass body.

If a low OH fused silica blank is desired, the amorphous particles are consolidated in a chlorine-containing environment to remove the water and purify the glass. In one preferred process, the deposit of amorphous particles are consolidated in a He/HCl-containing atmosphere to form a transparent glass body having OH content less than 10 ppm. In those applications where low OH is not particularly desired, the amorphous particles can be consolidated in a non-chlorine-containing atmosphere.

The resulting glass body or blank, can then be doped with molecular hydrogen at high pressure and low temperature to form a glass member having high resistance to optical damage in ultraviolet radiation in the wavelength range of 300 nm or less, even in glasses having an OH content below 50 ppm.

Useful silicon-containing compounds for forming the glass blank preferably include any halide-flee cyclosiloxane compound, for example, polymethylsiloxane such as hexamethyldisiloxane, polymethylcyclosiloxane, and mixtures of these. Examples of particularly useful polymethylcyclosiloxane include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula

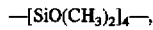

is used as the feedstock for the fused silica boule process, or in the vapor deposition processes such as used in making high purity fused silica for optical waveguide applications. In addition to halide-flee cyclosiloxane compounds, $SiCl_4$ can also be used as the feedstock in the silica boule process to produce high purity fused silica of the invention provided that the OH content is low. However, for safety and environmental reasons, halide-free, cylcosiloxane compounds are preferred. By low OH content, we mean that the OH concentration is less than 50 ppm. In fact, our invention can be utilized with glasses having OH content less than 20 ppm or even less than 10 ppm, measured from values of the beta-OH.

As stated above, the high purity fused silica blank is subjected to treatment in a high pressure, low temperature hydrogen environment for a time sufficient to render the fused silica resistant to optical damage when exposed to high intensity short wave radiation. In particular, the hydrogen treatment continues for a time sufficient to prevent the 190–300 nm optical absorption of fused silica associated with prolonged exposure to 248 nm or 193 nm excimer laser.

The upper limit of the doping temperature is determined by the temperature at which reaction of hydrogen with silica is observed. Preferably, the doping is done at a low temperature to improve the impregnation of hydrogen into the glass since the solubility of hydrogen is higher at lower temperatures. In addition to equipment limitations, the upper limit of the pressure will depend on the desired amount of hydrogen to be infused into the glass, the thickness of the glass and other variables. Preferably, the glass blank is doped in hydrogen at a temperature of about 500° C. or less, more preferably, less than about 350° C. and at a pressure above 150 atmospheres. Increased pressure makes it possible to impregnate glass in a shorter period of time and provides protection against greater levels of exposure. It should be appreciated that sufficiently high pressures entail practical difficulties. Therefore, the maximum pressure will be determined by the practical limitations of the available apparatus. Similarly, the duration of the doping step will depend on the optical length of the glass member or blank, the doping temperature and pressure, as well as other variables. For any desired application, the optimum doping temperature, pressure and duration can be easily determined by experimentation.

EXAMPLES

Example 1

In one example, a sample of high purity fused silica glass prepared by the soot process and having very low OH content was loaded with $H_2$ in the manner described above and then exposed to excimer laser (250 mJ/cm$^2$ at 248 nm). The amount of $H_2$ infiltrated into the glass was estimated to be about 600 ppm molar (that is, $H_2$/$SiO_2$) or about $10^{19}$ $H_2$ molecules/cm$^3$ of glass. Effectively, this amount of hydrogen would protect against the creation of $10^{19}$ E' centers. With $10^6$ pulses, ESR measurements indicated that about $10^{15}$–$10^{16}$ E' centers would be created. Based on our calculations, we estimate that the amount of dissolved hydrogen is roughly linear with the pressure of hydrogen.

Example 2

Figure 3:
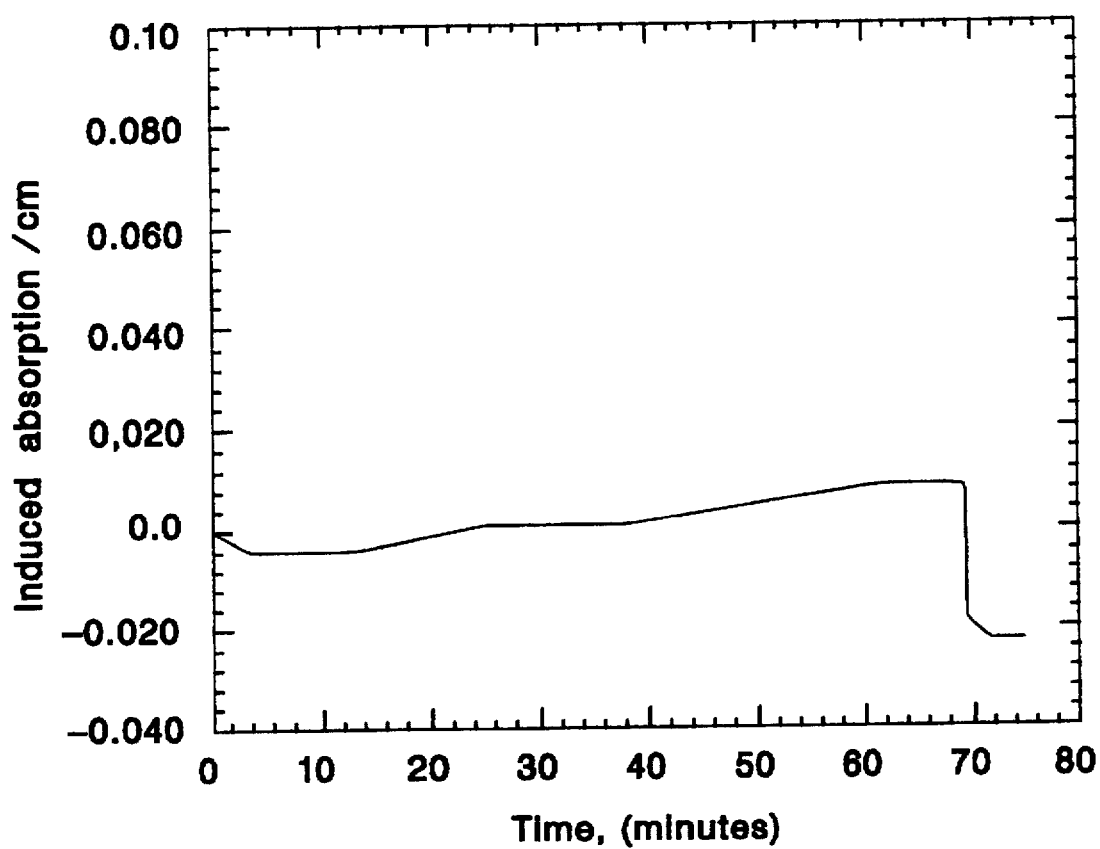

The following example was carried out using fused silica sample prepared by the soot process using as the silica source, octamethylcylcotetrasiloxane (OMCTS). A sample, having a 5 mm path length was placed in a Parr pressure reactor at 275° C. at 1180 psi of $H_2$ for twenty days. This time (20 days) corresponded to a loading of hydrogen to 90% of the ambient at the midplane of the sample. The sample was then exposed to 248 nm excimer laser irradiation, 350 mJ/cm$^2$ at 400 Hz for a total of 13 million pulses. The optical spectrum measured on-line, during the final 1 million pulses is shown in FIG. 3. As a reference, the measured on-line induced absorption that occurs in an untreated sample of silica is shown in FIG. 4.

Figure 4:
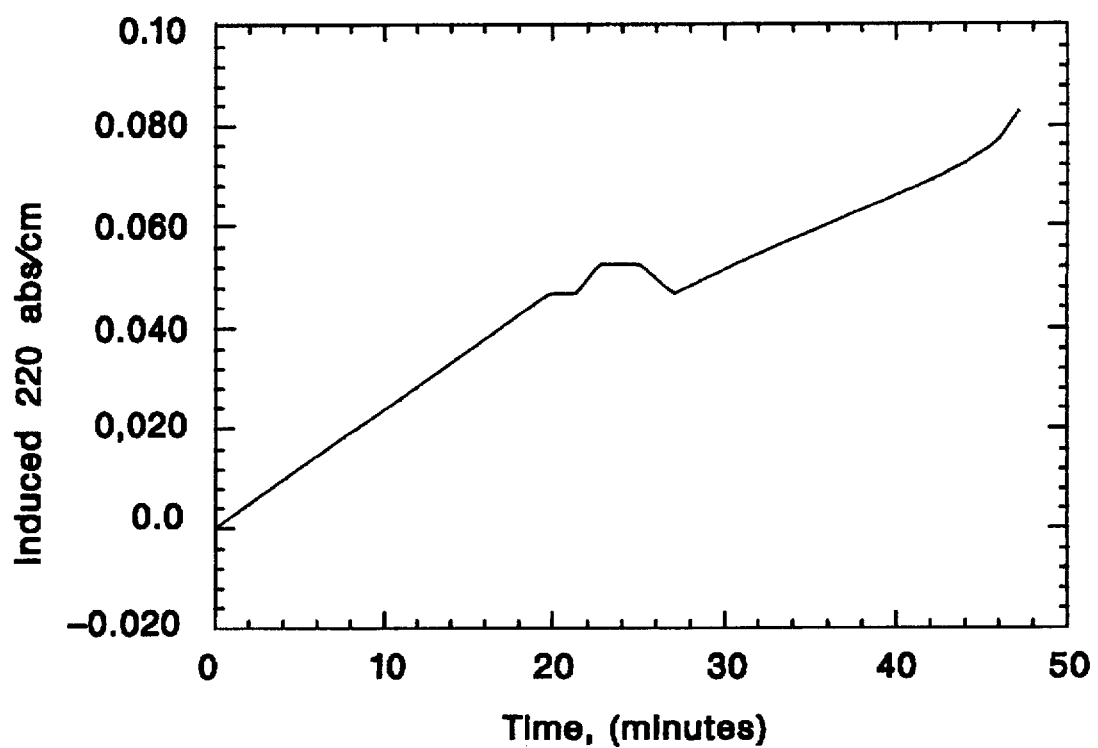

As shown, the induced absorption is less than 0.01 cm$^{-1}$ at 220 nm for the hydrogen-treated sample after 13 million pulses of exposure (FIG. 3), compared to close to 0.1 cm$^{-1}$ for the untreated sample after only 1 million pulses (FIG. 4). The 220 nm absorption which is clearly evident in the untreated sample is attributed to the E' center.

The proposed reaction is as follows:

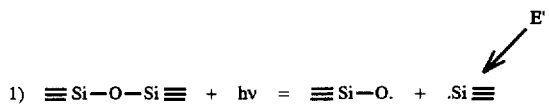

The induced absorption comes from the Si E' center, represented in the above equation as ≡Si. Without intending to be bound by theory, in the presence of $H_2$, the reaction is thought to follow the form

(2)

and

(3)

The concentration of the molecular hydrogen is estimated to be about $4 \times 10^{20}$. We also estimate that the exposure produced the order of about $10^{17}$ centers.

In addition to the embodiments discussed above, it will be clear to persons skilled in the art that numerous modifications and changes can be made to the above invention without departing from its intended spirit and scope.

We claim:

1. In a high purity fused silica glass member resistant to optical damage in ultraviolet radiation in the wavelength range between 190 and 300 nm, the glass member being characterized by an OH content no greater than 50 ppm, the improvement being that said glass member is resistant to optical damage up to $10^7$ pulses (350 mJ/cm$^2$) at the laser wavelength of 248 nm.

2. The fused silica glass member of claim 1, further characterized by having at least $10^{18}$ $H_2$ molecules/cm$^3$ of glass.

3. A high purity fused silica glass resistant to optical damage in ultraviolet radiation in the wavelength range between 190 and 300 nm, the glass member being characterized by an OH content no greater than 50 ppm and being resistant to optical damage up to $10^7$ pulses (350 mJ/cm$^2$) at the laser wavelength of 248 nm, formed by:

a) producing a gas stream containing a silicon-containing compound in vapor form capable of being converted through thermal decomposition with oxidation or flame hydrolysis to $SiO_2$;

b) passing the gas stream into the flame of a combustion burner to form amorphous particles of fused $SiO_2$;

c) depositing the amorphous particles onto a support;

d) consolidating the deposit of amorphous particles in a chlorine-containing atmosphere to form a transparent glass body having an OH content of no greater than 50 ppm; and e) doping the transparent glass body with molecular hydrogen at a pressure in the range of 1–150 atm and a temperature no greater than 500° C., to form a glass member having high resistance to optical damage.

* * * * *

UNITED STATES PATENT AND TRADEMARK OFFICE
CERTIFICATE OF CORRECTION

PATENT NO. : 5,668,067
DATED : 9/16/97
INVENTOR(S) : Roger J. Araujo, Nicholas F. Borrelli, Christine L. Hoaglin, and Charlene Smith It is certified that error appears in the above-indentified patent and that said Letters Patent is hereby corrected as shown below:

Column 1, line 47, "fight" should read --light.

Column 5, line 8, "carder" should read --carrier--.

Column 6, lines 3 and 5 (three instances only), "OH" should read --OH---.

Claim 3, line 4, "OH" should read --OH⁻--.

Claim 3d), line 3, "OH" should read --OH⁻--.

Signed and Sealed this

Ninth Day of December, 1997

Attest:

BRUCE LEHMAN

Attesting Officer

Commissioner of Patents and Trademarks